United States Patent [19]
Hennigan

[11] Patent Number: 6,041,737
[45] Date of Patent: Mar. 28, 2000

[54] LITTER BOX TRAINER

[76] Inventor: Michael Ross Hennigan, 195 Woodvale, Houston, Tex. 77012

[21] Appl. No.: 09/222,166

[22] Filed: Dec. 31, 1998

[51] Int. Cl.[7] .................................................. A01K 29/00
[52] U.S. Cl. .............................. 119/165; 119/161; 119/55
[58] Field of Search .................... 119/161, 163, 119/165, 55, 56.1, 511, 52.1, 51.11, 51.12, 842

[56] References Cited

U.S. PATENT DOCUMENTS

| | | | |
|---|---|---|---|
| 3,011,476 | 12/1961 | Bell | 119/417 |
| 4,117,555 | 10/1978 | Dennis | 119/163 |
| 4,517,923 | 5/1985 | Palmer | 119/165 |
| 4,589,372 | 5/1986 | Smith | 119/51.02 |
| 4,617,876 | 10/1986 | Hayes | 119/842 |
| 4,733,634 | 3/1988 | Hooser | 119/51.12 |
| 4,770,125 | 9/1988 | Gold et al. | 119/53.5 |
| 4,889,077 | 12/1989 | Possis | 119/51.11 |
| 5,113,801 | 5/1992 | Rotstein et al. | 119/163 |

*Primary Examiner*—Michael J. Carone
*Assistant Examiner*—James S. Bergin

[57] ABSTRACT

A litter box trainer apparatus (10) comprising a litter box (11) attached to the top of a scale (12) which outputs the weight of the litter box (11) to the computer processing unit (13) which when sensing a weight increase which would indicate a cat defecated or urinated in the litter box (11) signals the treat dispenser (14) to dispense a treat for the cat, also the praise display (15) is signaled to display a praise. The user interface keypad (16) is used to turn the apparatus on and off, and also to program the apparatus (10). The invention is designed to train a cat to use a litter box and also to give a cat the incentive to consistently use the litter box.

9 Claims, 1 Drawing Sheet

LITTER BOX TRAINER

TECHNICAL FIELD

This invention relates generally to the field of cat litter boxes and, more particularly to the field of training cats to use their litter box.

BACKGROUND OF THE INVENTION

Until the present invention there was very little available to cat owners to help them train their cats to use their litter boxes, although some cats have no problem using their litter boxes some cats are more difficult to train and even most cats that don't normally have a problem will occasionally make mistakes. The only real add to help cat owners was odor products or litter with odor built into the product designed to lure the cat to the litter box, but this helped very little in most cases. The present invention is designed to train almost any cat to use their litter box consistently with very little effort from the cat, owner and maintain that consistency forever. The invention senses when the cat uses the litter box and rewards the cat by dispensing a eatable treat therefore giving the cat a real incentive to use the litter box.

BRIEF SUMMARY OF THE INVENTION

The present invention involves a cat litter box, a sensitive scale under the litter box which constantly weighs the litter box and outputs the updated weights of the litter box to a computer processing unit which analyzes the data and when it detects a weight difference which would indicate that the cat has either defecated or urinated in the litter box the processing unit signals the treat dispenser to dispense a treat for the cat. The dispenser may dispense an assortment of treats such as toys to play with, treats to eat and or a recording either standard or recorded by the cat owner to praise the cat, also a visual display may be made either to praise or reward the cat such as a video monitor displaying a standard or a recorded video recorded by the cat owner or a picture which is displayed and may be a standard picture or a picture provided by the cat owner. The main objective of the invention is to provide a reward for the cat when it correctly uses its litter box even in the cat owners absence. The invention also contemplates the invention may be used to train other pets to use a litter box such as dogs, pigs, etc.

BRIEF DESCRIPTION OF THE DRAWINGS

Other objects and many additional advantages will be more readily understood by those skilled in the art after a detailed consideration of the following specification taken with the accompanying drawings wherein.

BEST MODE FOR CARRYING OUT THE INVENTION

Figure 1:
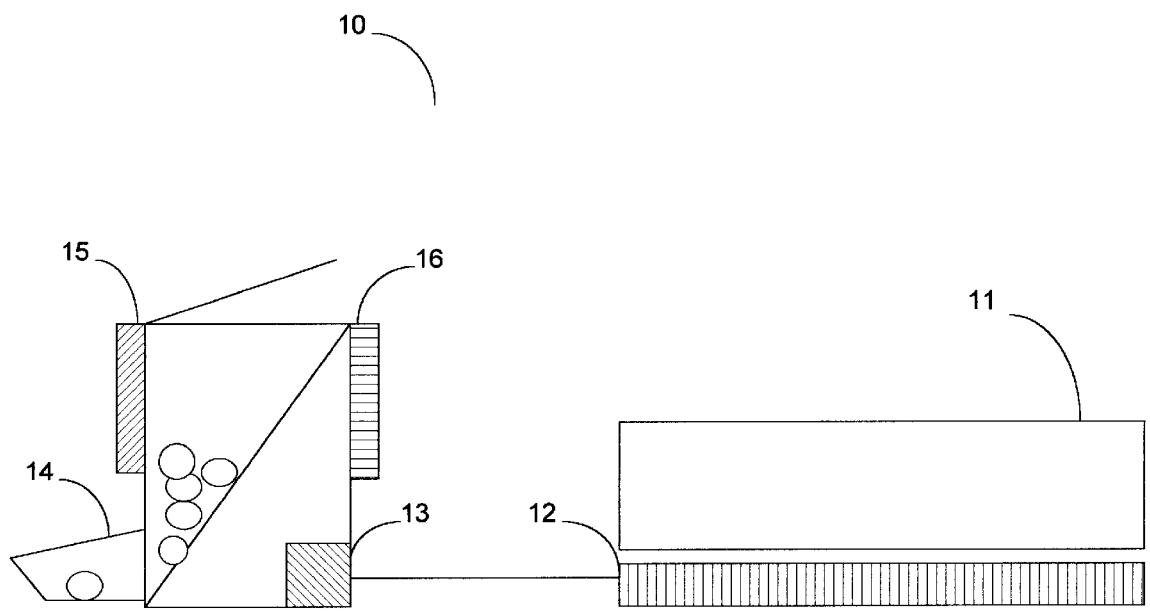
FIG. 1 is a side view of the invention.

As can be seen by reference to FIG. 1, the litter box trainer apparatus of the present invention is designated generally by the reference numeral (10). The apparatus (10) comprises in general a litter box (11) a very sensitive scale (12) a computer processing unit (13) a treat dispenser (14) a audio and or video praise display (15) and a user interface keypad (16). The litter box (11) could be latched to the top of the scale (12). The scale (12) constantly measures the weight of the litter box (11), also the scale constantly outputs the data to a computer processing unit (13), which constantly analyzes the data, and when it senses a weight increase which would indicate the cat has defecated or urinated in the litter box (11) the computer processing unit (13) signals the treat dispenser (14) to dispense a treat to the cat as a reward for the cat, also the computer processing unit may signal the praise display (15) to display a praise to the cat, which may be audio and or video, and may be standard or recorded by the cat owner. The user interface keypad (16) is used by the user to turn the apparatus (10) on and off, and also to program the apparatus (10). The apparatus (10) may be battery powered or powered by a transformer which steps down to low voltage for safety reasons. The computer processing unit (13) follows certain guidelines to eliminate false alarms such as the cat just touching or standing in the litter box (11). The weight increase must not be too small or too large, which would be user programmable and the weight increase must be maintained for a certain amount of time, also user programmable. An example default setting is three to sixteen ounces maintained for ten seconds.

I claim:

1. A litter box trainer apparatus for a pet comprising:

a litter box positioned on the top surface of a weighing scale, said weighing scale constantly measuring the weight of the litter box and it's contents;

a CPU in permanent data communication with said weighing scale for detecting a predetermined weight difference in the measured weight of the litter box, said weight difference maintained for a predetermined period of time;

a treat dispenser in permanent data communication with said CPU for dispensing a treat to an animal in response to the detection of said predetermined weight difference;

a praise display in permanent data communication with said CPU for providing an audio and/or video output in response to the detection of said predetermined weight difference; and a user interface keypad for programming the CPU and for functioning as an on/off switch.

2. A litter box trainer apparatus as in claim 1; wherein, the litter box is attached or latched to the top of the weighing scale.

3. A litter box trainer apparatus as in claim 1; wherein, the weighing scale constantly measures the weight of the litter box and outputs that data to the computer processing unit.

4. A litter box trainer apparatus as in claim 1; wherein, the computer processing unit constantly monitors the weight of the litter box and if the weight of the litter box remains the same for a programmed amount of time the scale zeros out, and when the weight of the litter box increases within a programmed range for a programmed amount of time the treat dispenser is signaled to dispense a treat for the pet and also the praise display is signaled to display a praise for the pet.

5. A litter box trainer apparatus as in claim 4; wherein, the treat dispenser when signaled by the computer processing unit dispenses a treat, which said treat is a toy or an edible treat.

6. A litter box trainer apparatus as in claim 4; wherein, the treat dispenser holds multiple treats.

7. A litter box trainer apparatus as in claim 4; wherein, the praise display when signaled by the computer processing unit displays a praise display, which is an audio or a video output.

8. A litter box trainer apparatus as in claim 1; wherein, said weight difference is from about three to about sixteen ounces, said weight differrence being maintained for about ten seconds.

9. A litter box trainer apparatus as in claim 1; wherein, the litter box trainer apparatus dispenses a treat which can be either a toy to play with or an edible treat for a pet, when said pet correctly uses the litter box to urinate or defecate.

* * * * *